US006721454B1

United States Patent
Qian et al.

(10) Patent No.: US 6,721,454 B1
(45) Date of Patent: Apr. 13, 2004

(54) METHOD FOR AUTOMATIC EXTRACTION OF SEMANTICALLY SIGNIFICANT EVENTS FROM VIDEO

(75) Inventors: Richard Qian, Vancouver, WA (US); Niels C. Haering, Orlando, FL (US)

(73) Assignee: Sharp Laboratories of America, Inc., Camas, WA (US)

(*) Notice: Subject to any disclaimer, the term of this patent is extended or adjusted under 35 U.S.C. 154(b) by 0 days.

(21) Appl. No.: 09/346,550

(22) Filed: Jul. 1, 1999

Related U.S. Application Data

(60) Provisional application No. 60/103,643, filed on Oct. 9, 1998.

(51) Int. Cl.$^7$ .............................. G06K 9/62; G06F 17/30
(52) U.S. Cl. ....................... 382/224; 382/103; 382/173; 382/305; 707/3
(58) Field of Search ................................ 382/103, 107, 382/168, 170–171, 173, 181, 224, 226–227, 232–233, 236, 240, 243, 305; 348/169, 135, 142, 143, 152; 375/240.08; 707/101, 102, 104.1

(56) References Cited

U.S. PATENT DOCUMENTS

| 5,664,227 A | * | 9/1997 | Muldin et al. ............... 707/516 |
| 5,821,945 A | * | 10/1998 | Yeo et al. .................... 345/440 |
| 5,969,755 A | * | 10/1999 | Courtney .................... 348/143 |

OTHER PUBLICATIONS

Yeung, et al. "Extracting Story Units from Long Programs for Video Browsing and Navigation", IEEE, pp. 296–305, 1996.*

Qian, et al. "A Computational Approach to Semantic Event Detection", IEEE, pp. 200–206, Jun. 1999.*

Vasconcelos, et al "Bayesian Modeling of Video Editing and Structure: Semantic Features for Video Summarization and Browsing", IEEE Oct. 4, 1998, pp. 153–157.*

Somoliar, et al "content–based video indexing and retrieval", IEEE, pp. 62–72, 1994.*

Maybury, et al "multimedia summaries of broadcast news", IEEE, pp. 442–449, 1997.*

Yeo, et al "retrieving and visualizing video", ACM, pp. 44–52, Dec. 1997.*

Gunsel, et al "hierarchical temporal video segmentation and content characterization", SPIE, pp. 46–56, 1997.*

DeMenthon, et al "video summarization by curve simplification", ACM, pp. 211–218, Aug. 1998.*

Ponceleon, et al "key to effective video retrieval: effective cataloging and browsing", ACM, pp. 99–107, Aug. 1998.*

"A Robust Real–Time Face Tracking Algorithm," by Richard J. Qian, M. Ibrahim Sezan and Kristine E. Matthews; Sharp Laboratories of America.

(List continued on next page.)

*Primary Examiner*—Daniel Mariam
(74) *Attorney, Agent, or Firm*—Chernoff Vilhauer McClung & Stenzel, LLP

(57) ABSTRACT

Semantically meaningful events are detected in video with a multi-level technique. Video sequences are visually analyzed at the first level of the technique to detect shot boundaries, to measure color and texture of the content, and to detect objects in the content. At the second level of the technique, objects are classified and the content in each shot is summarized. At the third level of the technique, an event inference module infers events on the basis of temporal and spatial phenomena disclosed in the shot summaries. The technique may be extended to additional domains by incorporating additional domain related processes at the upper levels of the technique which utilize data produced at the first level of the technique by processes which are domain independent.

15 Claims, 9 Drawing Sheets

OTHER PUBLICATIONS

"Video Skimming for Quick Browsing based on Audio and Image Characterization," by Michael A. Smith and Takeo Kanade; Carnegie Mellon University, Jul. 1995; pp. 1–21.

"Content–Based Video Browsing Tools," by HongJiang Zhang, Stephen W. Smoliar and Jian Jhua Wu; Institute of Systems Science, National University of Singapore; *SPIE* vol. 2417; pp. 389–398.

"Video Visualiztion for Company Presentation and Fast Browsing of Pictorial Content," Minerva M. Yeung, Boon–Lock Yeo; *IEEE Transactions on Circuits and Systems for Video Technology* vol. 7, No. 5, Oct. 1997, pp. 771–785.

"A Spatial Logic for Symbolic Description of Image Contents," Alberto Del Bimbo; Enrico Vicario and Daniele Zingoni; *Journal of Visual Languages and Computing*, 1994, pp. 267–286.

"Analysis and Presentation of Soccer Highlights from Digital Video," Dennis Yow, et. al.; Princeton University; 1995.

"Automated Analysis and Annotation of Basketball Video," Drew D. Saur, et. al.; *SPIE* vol. 3022; pp. 176–187.

"Automatic Video Indexing via Object Motion Analysis," by Jonathan D. Courtney; *Pattern Recognition*; Apr., 1997, pp. 1–31.

"Indexing of Baseball Telecast for Content–based Video Retrieval," Toshio Kawashima, et. al., *IEEE*; 1998, pp. 871–874.

"Textural Features for Image Classification," by Robert M. Haralick; K. Shanmugam and Its'hak Dinstein; *IEEE*; Nov., 1973, pp. 610–620.

"Models for Automatic Classification of Video Sequences," by Giridharan Iyengar and Andrew Lippman; *SPIE* vol. 3312, pp. 216–227.

"A Theoretical Comparison of Texture Algorithms," by Richard W. Conners and Charles A. Harlow; *IEEE* Vo. PAMI–2, No. 3, May 1980, pp. 204–222.

"Texture Features for Browsing and Retrieval of Image Data," by B.S. Manjunath and W.Y. Ma; *IEEE Transactions on Pattern Analysis and Machine Intelligence*; vo. 18, No. 8, Aug. 1996, pp. 837–842.

"Improved Fractal Geometry Based Texture Segmentation Technique," by B.B. Chaudhuri, et. al., *IEE Proceedings–E*; Vol. 140, No. 5, Sep. 1993, pp. 233–241.

\* cited by examiner

---------- General Information ----------

90 — Forced/real shot summary : 0
92 — First frame of shot : 64
94 — Last frame of shot : 236
96 — Global motion estimate (x,y) : (-4.48, 0.01)
98 — Within frame animal motion estimate : (-0.17, 0.23)
100 — Initial position (x,y) : (175, 157)
102 — Final position (x,y) : (147, 176)
104 — Initial size (w,h) : (92, 67)
106 — Final sizd (w,h) : (100, 67)
108 — Motion smoothness throughout shot (x,y) : (0.83, 0.75)
110 — Precision throughout shot : (0.84)
112 — Recall throughout shot : (0.16)

---------- Hunt Information ----------

114 — Tracking : 1
116 — Fast : 1
118 — Animal : 1
120 — Beginning of hunt : 1
122 — Number of hunt shot candidates : 1
123 — End of hunt : 0
124 — Valid hunt : 0

FIG. 9

METHOD FOR AUTOMATIC EXTRACTION OF SEMANTICALLY SIGNIFICANT EVENTS FROM VIDEO

CROSS-REFERENCE TO RELATED APPLICATIONS

This application claims the benefit of U.S. Provisional Application No. 60/103,643, filed Oct. 9, 1998.

BACKGROUND OF THE INVENTION

The present invention relates to a technique for detecting and indexing semantically significant events in a video sequence.

There has been a dramatic increase in the quantity of video available to the public. This trend is expected to continue or accelerate in the future with the convergence of personal computers and digital television. To improve the value of this information to users, tools are needed to help a user navigate through the available video information and find content that is relevant. For "consumer" users, such tools should be easy to understand, easy to use, and should provide reliable and predictable behavior.

Generally, there are three categories of known content-based video indexing and retrieval systems. A first category includes methods directed to the syntactic structure of video. This category includes methods of shot, boundary detection, key frame extraction, shot clustering, tables of contents creation, video summarizing, and video skimming. These methods are generally computationally conservative and produce relatively reliable results. However, the results may not be semantically relevant since the methods do not attempt to model or estimate the meaning of the video content. As a result, searching or browsing video may be frustrating for users seeking video content of particular interest.

A second category of video indexing and retrieval systems attempts to classify video sequences into categories, such as, news, sports, action movies, close-ups, or crowds. These classifications may facilitate browsing video sequences at a coarse level but are of limited usefulness in aiding the user to find content of interest. Users often express-the object of their searches in terms of labels with more exact meanings, such as, keywords describing objects, actions, or events. Video content analysis at a finer level than available with most classification systems is desirable to more effectively aid users to find content of interest.

The third category of techniques for analyzing video content applies rules relating the content to features of a specific video domain or content subject area. For example, methods have been proposed to detect events in football games, soccer games, baseball games and basketball games. The events detected by these methods are likely to be semantically relevant to users, but these methods are heavily dependent on the specific artifacts related to the particular domain, such as editing patterns in broadcast programs. This makes it difficult to extend these methods to more general analysis of video from a broad variety of domains.

What is desired, therefore, is a method of video content analysis which is adaptable to reliably detect semantically significant events in video from a wide range of content domains.

SUMMARY OF THE INVENTION

The present invention overcomes the aforementioned drawbacks of the prior art by providing a method of detecting an event in a video comprising the steps of analyzing the content of the video; summarizing the analysis; and inferring an event from the summary. The video event detection process is, thus, decomposed into three modular levels. Visual analysis of the video content, including shot detection, texture and color analysis, and object detection occurs at the lowest level of the technique. At the second level, each shot summarized based on the results produced by the visual analysis. At the highest level of the technique, events inferred from spatial and temporal phenomena disclosed in the shot summaries. As a result, the technique of the present invention detects event which are meaningful to a video user and the technique may be extended to a broad spectrum of video domains by incorporating shot summarization and event inference modules that are, relatively, specific to the domain or subject area of the video which operate on data generated by visual analysis processes which are not domain specific.

The foregoing and other objectives, features and advantages of the invention will be more readily understood upon consideration of the following detailed description of the invention, taken in conjunction with the accompanying drawings.

BRIEF DESCRIPTION OF THE DRAWINGS

FIG. 9 is an exemplary shot summary for a wildlife video sequence.

DETAILED DESCRIPTION OF THE PREFERRED EMBODIMENT

Figure 1:
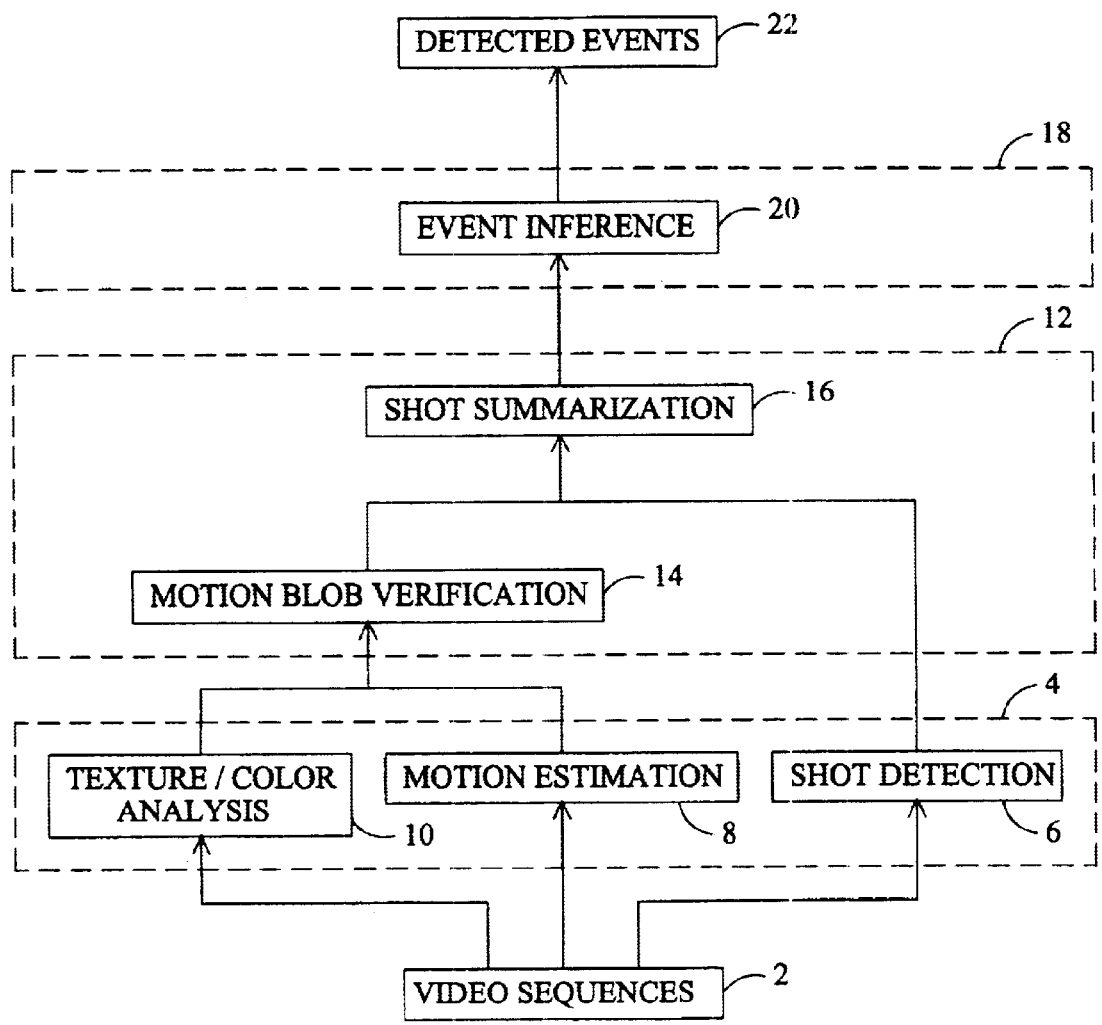
FIG. 1 is a block diagram of the video event detection technique of the present invention.

In a video sequence an event can be inferred by temporal and spatial phenomena related to objects in the video content. For example, in a wildlife video, a hunt by an animal might be inferred by a period of relatively slow motion of the hunter as it stalks the prey followed by rapid movement of the prey and hunter which is, in turn, followed by a period of little or no movement of the hunter. Referring to FIG. 1, in the technique of the present invention the detection of semantically significant events in video is decomposed into three levels. A video sequence 2 is input to the first level 4 of the technique where it is decomposed into shots 6. In addition, motion estimation 8 is performed to determine the global or overall motion of the content and to locate objects in the content which are moving independent of the global motion. The color and texture of the content of each frame are also analyzed 10 at the first level 2 of the technique. At the second level 12 of the technique, moving objects or motion blobs in each shot are verified or classified 14 and each shot is summarized 16. At the third level 18 of the technique, events 22 are inferred from the shot summaries by a domain specific event inference module 20.

Extraction of semantically significant events in video is a complex process. Heretofore, techniques for detecting video events have either compromised on the output to reduce the complexity of the process or been limited in their application by the use of domain specific processes. The present inventors realized that the modular construction of the technique of the present invention provides power, flexibility, and ease of extension to a wide variety of video domains and applications. At the lowest level of the technique, visual analysis processes which are not specific to an application or video domain provide basic information about the content of the video. As desired for speed, processing efficiency, accuracy, etc., alternative visual analysis processes may be used to identify the syntactic attributes of the video. The processes of the second level are more specific to a domain or application than those of the first level, but their outputs may be useful by several third level event inference modules or applications. For example, identification of animals in video might be utilized by several event inference modules designed to detect different animal related events. Likewise, shot summaries generated at the second level of the technique might be tailored for use by video professionals or consumers. At the third level of the process, event inference modules provide the domain specific structure necessary for reliable event detection, but the technique may be easily extended to other domains by adding modules containing rules specific to the additional domain.

The video sequence 2 is input to the first level 4 of the technique. A video sequence includes one or more scenes which, in turn, include one or more video shots. A shot comprises a plurality of individual frames of relatively homogeneous content. At the first level of the technique 4, the boundaries of the constituent shots of the sequence are detected 6. A color histogram technique may be used to detect the boundaries of the shots. The difference between the histograms of two frames indicates a difference in the content of those frames. When the difference between the histograms for successive frames exceeds a predefined threshold, the content of the two frames is assumed to be sufficiently different that the frames are from different video shots. Other known techniques could be used to detect the shot boundaries.

In addition to the shot boundaries detected in the video sequence, shot boundaries may be forced or inserted into the sequence whenever the global motion of the content changes. As a result, the global motion is relatively homogeneous between the boundaries of a shot. In addition, shot boundaries may be forced after a specific number of frames (e.g., every 200 frames) to reduce the likelihood of missing important events within extended shots.

At the first level 4 of the technique, the global motion of the video content is estimated 8 for each pair of frames in a shot. In analyzing wildlife video, motion estimation is provided for a three-parameter system accommodating zoom, and horizontal and vertical translation. In the three-parameter system, global motion may be expressed as:

$$u(x,y) = a_0 + a_2 x$$
$$v(x,y) = a_1 + a_2 y$$

Figure 2:
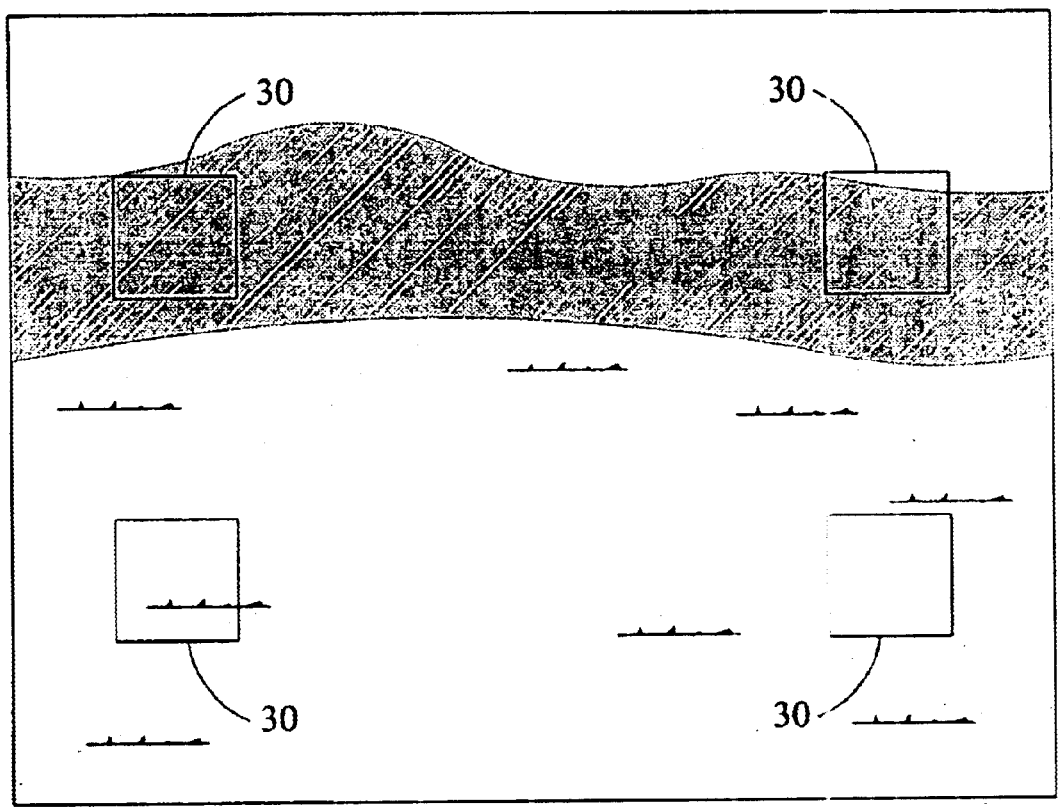
FIG. 2 illustrates global motion search regions in an exemplary video frame.

The global motion is estimated by block matching in four motion search areas 30 in the video frame, as illustrated in FIG. 2. Several problems are encountered in attempting to reliably recover the global motion parameters from video content. First, as the camera moves to track a moving object of interest, corresponding features may be located far apart in adjacent frames. For example, in wild animal hunt segments frame-to-frame displacements of 50 to 60 pixels are common and peak displacements can exceed 100 pixels. In addition, interlacing can dramatically change the appearance of small objects and textures in adjacent frames and camera motion to track a rapidly moving object of interest may blur the background features used for global motion estimation. Further, a video shot may encompass strongly varying lighting conditions or visual obstruction. For example, a video sequence of a wild animal's hunt may lead through open areas or areas where visibility and sunlight are obstructed by trees or bushes.

In the instant technique, global motion is estimated with a five level pyramid technique applied to the four motion search regions 30. Since large displacements between frames are probable, locating matching regions 30 in adjacent frames with an exhaustive search could be computationally intensive. A five level pyramid of reduced resolution representations of each frame reduces the computation necessary to match the motion search regions 30 in successive frames. At each level of the pyramid, matches are tested from a 5-pixel×5-pixel neighborhood around the location of each of the search regions 30 in the first frame. This enables a maximum matching distance of 62 pixels. The levels of the pyramid are obtained by subsampling the lower level image rather than calculating a more accurate Gaussian pyramid. The additional accuracy which might be obtained from using a Gaussian pyramid could, however, be obtained with additional computational effort.

At the lowest level of the pyramid (the full resolution representation of the frame) the search regions 30 used for matching are 64-pixels×64-pixels in size. Regions of uniform texture often result in errors in displacement estimates. To avoid these errors, search regions 30 of insufficient texture may be discarded. A 2D variance measure, as follows, may be used to test the "amount of texture":

$$\text{var}_x = \frac{1}{m} \sum_{x=0}^{m-1} \left( \frac{1}{n} \sum_{y=0}^{n-1} (p(x,y) - p(x,.))^2 - q_x \right)^2$$

$$\text{var}_y = \frac{1}{n} \sum_{j=0}^{n-1} \left( \frac{1}{m} \sum_{i=0}^{m-1} (p(x,y) - p(.,y))^2 - q_y \right)^2$$

where p is an m x n image region; and p(x,.) and p(.,y) are the means of the $x^{th}$ column and $y^{th}$ row of, $p_x$ and $q_y$ are the means of:

$$\frac{1}{n} \sum_{y=0}^{n-1} (p(x,y) - p(x,.))^2, \text{ and } \frac{1}{m} \sum_{y=0}^{n-1} (p(x,y) - p(.,y))^2$$

for all x and y within p, respectively.

As an addition to motion estimates determined at each of the four motion search regions 30 of a frame, the previous best motion estimate is useful for predicting the location of the four motion search regions 30 in the present frame. A limited search in a 5-pixel×5-pixel neighborhood around the predicted location of a motion search region 30 is used to improve the motion estimate. As many as eight motion estimates may be used. However, since some motion search regions 30 may lack sufficient texture to pass the texture test, there may be fewer than eight motion estimates for a particular frame. The highest normalized dot product between a motion search region 30 (P1) in a first frame and a matched search region (P2) in the next frame determines the "correct" global motion estimate between the two succeeding frames. The normalized dot product is equal to the cosine of the angle ($\alpha$) between the vector representation of the two regions:

$$\cos(\alpha)_{P1,P2} = \frac{\sum_{i,j} P1(i,j) P2(i,j)}{\sum_{i,j} P1(i,j) \sum_{i,j} P2(i,j)}$$

Figure 3:
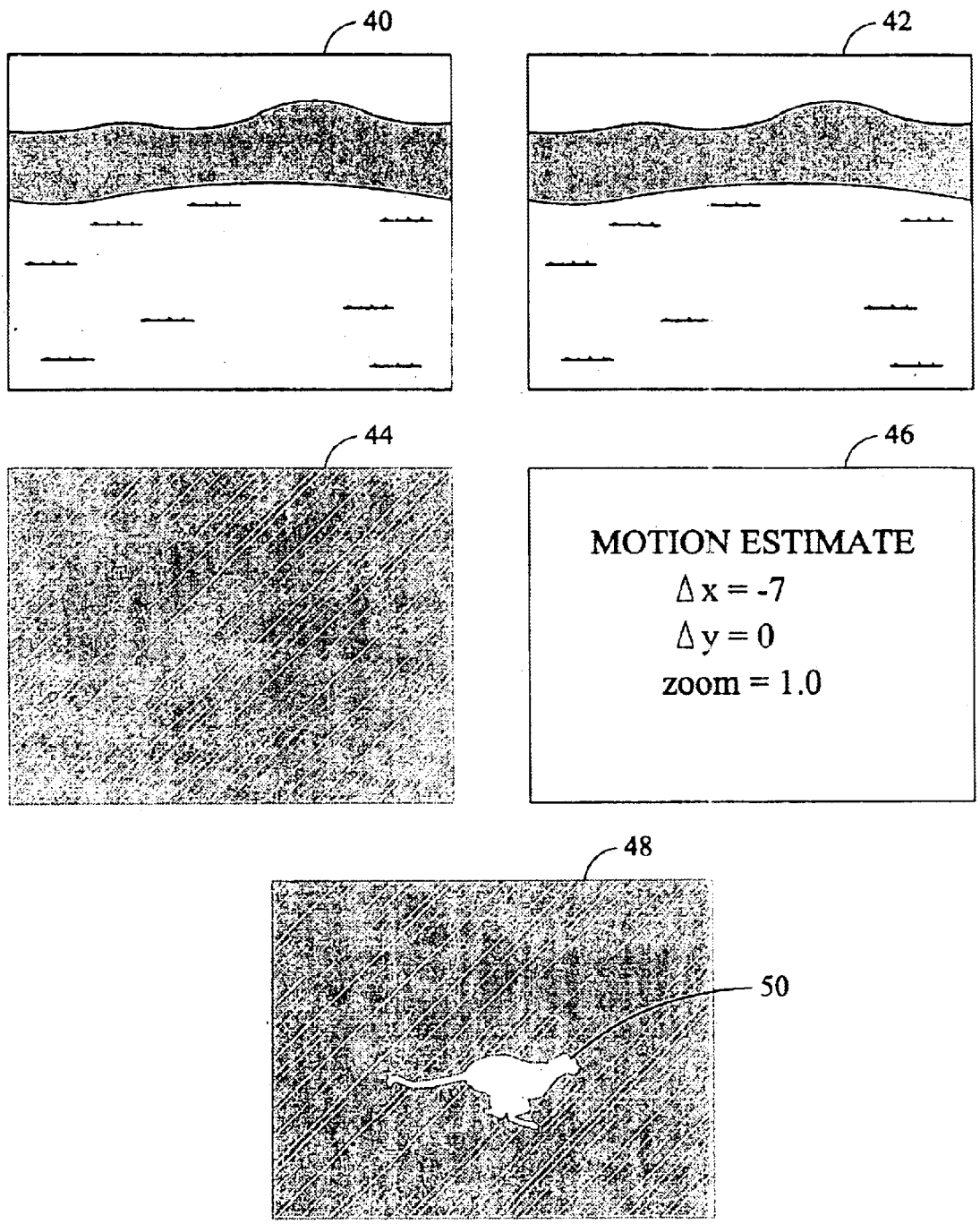
FIG. 3 illustrates moving object detection using difference maps of video content.
Figure 4:
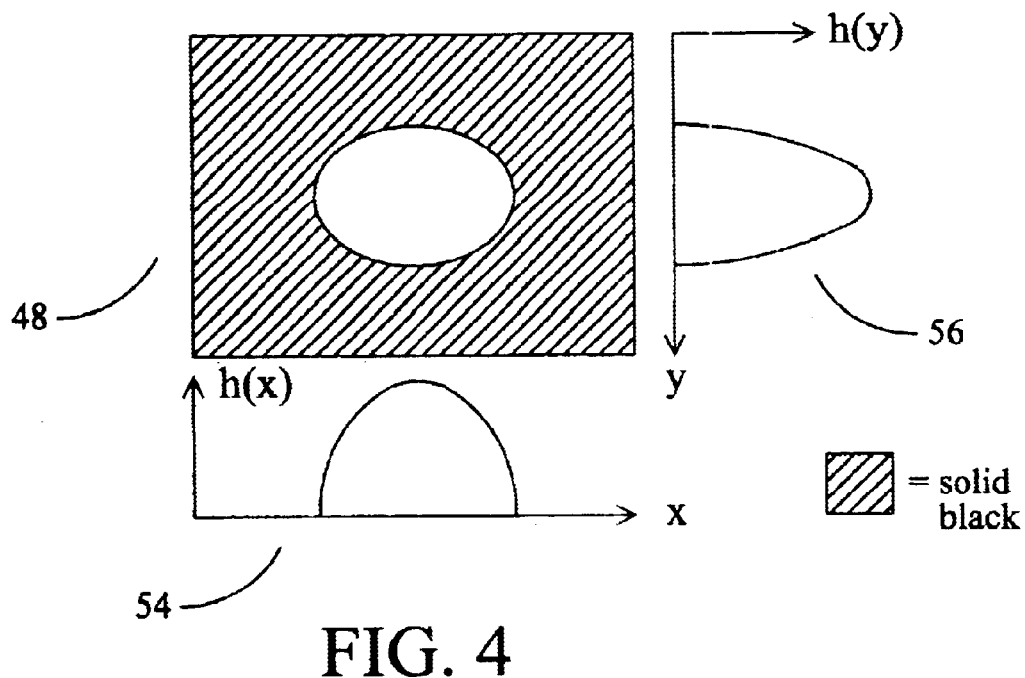
FIG. 4 illustrates exemplary 1D histograms of a frame difference map containing a single object as projected in the x- and y- directions.

As an alternative to the global motion estimation technique described above, motion estimation based on a Kalman filter could be utilized. The difference between succeeding frames may be determined from the global motion estimate. To detect objects moving independently of the global motion of a frame's content, the difference between the images in two successive frames is established and then adjusted by the global motion estimate. The residual error, after global motion compensation, is likely to represent an object which is moving independent of the background content. Referring to FIG. 3, two consecutive frames from an animal hunt video 40 and 42 illustrated. A gray level difference image 44, reflecting the difference in intensity of the pixels of the frames 40 and 42, is produced. The global motion estimate is applied to produce a motion compensated difference image 48. The image of an independently moving object 50, an animal, is apparent in the motion compensated difference image 48. In determining the location of moving objects in the content, areas of low residual error in the motion compensated difference image 48 can be assumed to have motion similar to the background and can be ignored. High residual error between a first frame and a motion compensated second frame are caused by objects which are moving independent of the background. A 1D histogram is constructed projecting the difference map along its x- 54 and y- 56 directions, as illustrated in FIG. 4. The instantaneous center position and size of an object can be estimated from statistical measurements derived from the histograms. For example, the center position and size of a moving object can be estimated using the sample means and standard deviations of the distributions. If the elements in the projection histograms for the x- 54 and y- 56 directions are denoted, respectively, $h_x(i), i=0,1, \ldots$, and $h_y(i), i=0,1, \ldots$, then the center position $(x_c, y_c)$ of the object may be estimated as:

$$x_c = \frac{\sum_i x_i h_x(i)}{\sum_i h_x(i)}$$

$$y_c = \frac{\sum_i y_i h_y(i)}{\sum_i h_y(i)}$$

The width (w) and height (h) of the object may be estimated as:

$$w = \alpha \left[ \frac{\sum_i (x_i - \mu_x)^2 h_x(i)}{\sum_i h_x(i)} \right]^{1/2}$$

$$h = \beta \left[ \frac{\sum_i (y_i - \mu_y)^2 h_y(i)}{\sum_i h_y(i)} \right]^{1/2}$$

where $\alpha$ and $\beta$ are constant scaling factors.

Figure 5:
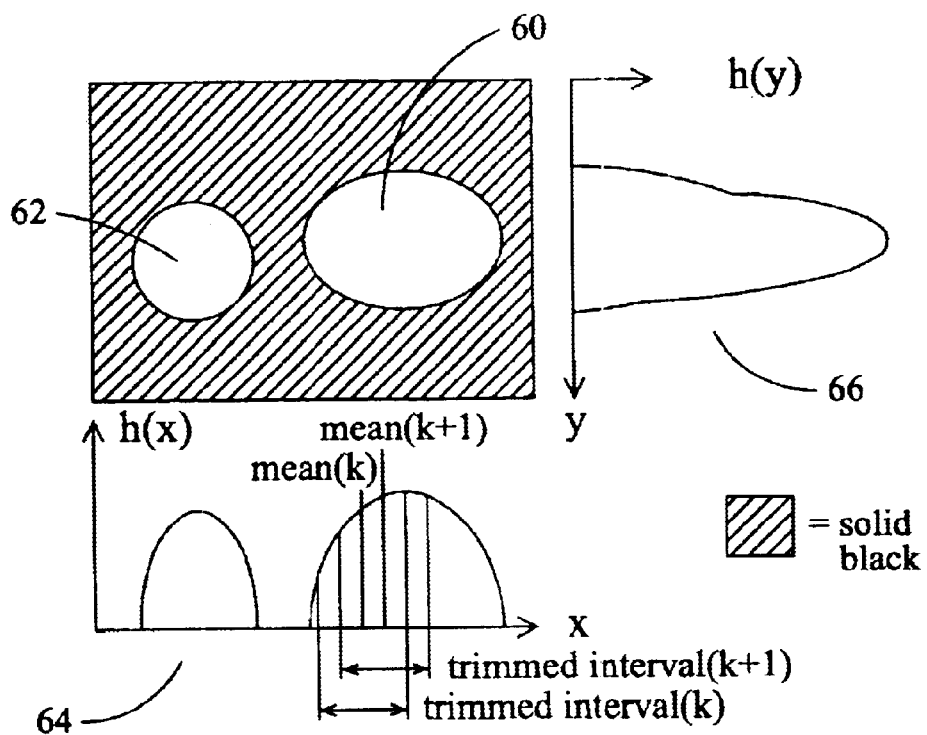
FIG. 5 illustrates exemplary 1D histograms of a frame difference map containing two objects as projected in the x- and y- directions.

Referring to FIG. 5, in images with more than one moving object 60 and 62 an object's center position and size derived from the sample mean and standard deviation may be biased. To address this potential, the center position of a dominant moving object is estimated based on the "trimmed" means of the two, 1D, x- 64 and y- 66 projection histograms. The sample mean $\mu$ and standard deviation rare computed for the total of the samples in the distribution. The trimmed mean is initially set equal to $\mu$, that is, $(\mu_t(0)=\mu)$ and $\delta$ is defined as $\delta=\max(a\sigma, b^*\text{sampleSpaceWidth})$ where a and b are scaling factors and sampleSpaceWidth is the image width and height in the x and y directions, respectively. The trimmed mean $\mu_t(k+1)$ is computed on the basis of the samples within the interval $[\mu_t(k)-\delta, \mu_t(k)+\delta]$. The computation of the trimmed mean is repeated until $|\mu_t(k+1)-\mu_t(k)|<\epsilon$, where $\epsilon$ is the tolerance, e.g., $\epsilon=1.0$. The center position of the dominant motion blob 60 is defined as the converged mean ($\mu^*$).

The size of objects in frames having multiple objects is estimated on the basis of the "trimmed" standard deviation. Given the center position ($\mu^*$) and $\delta$ obtained from the center locating routine, estimating the object size in either the x- or y- direction is accomplished by constructing a "clipped" projection histogram ($H^{clip}$) by projecting a color filtering map within the range of $[\mu^*_{opp}-\Delta, \mu+\Delta]$ in the opposite direction, where $\mu^*_{opp}$ is the clipped mean in the opposite direction and $\Delta$ determines the number of samples used in the calculation. Based on $H^{clip}$, the trimmed standard deviation $\delta_t$ is computed for the samples within the interval $[\mu^*-\delta_t, \mu^*+\delta]$. The trimmed standard deviation is increased until $H^{clip}(\mu^*+d\,\delta_t) \geq g\,H^{clip}(\mu^*)$ or $H^{clip}(\mu^*+d\,\delta_t) \geq g\,H^{clip}(\mu^*)$ where, for example, d=1.0 and g=0.4. The size of the object is set equal to c $\delta_t$ where c is a scaling factor, e.g. c=2.0.

In addition to shot boundary detection 6 and motion estimation 8, the texture and color of the video content is analyzed 10 at the first level 4 of the technique by describing each pixel of the frame in terms of color and texture measures. Multiple color and texture measures provide rich, expressive descriptors of the content. The color measures utilized include the normalized red (r), green (g), blue (b) intensities of the pixel and the pixel's gray value intensity, I, which may be determined as follows:

$$r = \frac{R}{R+G+B}$$

$$g = \frac{G}{R+G+B}$$

$$b = \frac{B}{R+G+B}$$

$$I = \frac{R+G+B}{R_{\max}+G_{\max}+B_{\max}}$$

The texture measures may be derived through the application of multi-resolution gray level co-occurrence matrices, fractal dimension estimation techniques, and a Gabor filter bank. The gray level co-occurrence matrix estimates the joint probability that a pair of points at a specified relative position in the image will have a particular pair of intensity levels. For application of the gray level co-occurrence matrix:

$$p(i, j, d, \theta) = \frac{P(i, j, d, \theta)}{R(d, \theta)}$$

where P(.) is the gray level co-occurrence matrix of pixels separated by distance d in orientation θ and where R(.) is the normalization constant that causes the entries of P(.) to sum to one.

The following measures are useful for texture classification. The angular second moment (E) (also called the Energy) assigns larger numbers to textures when the co-occurrence matrix is sparse:

$$E(d, \theta) = \sum_{j=1}^{N_g} \sum_{i=1}^{N_g} [p(i, j, d, \theta)]^2$$

The difference angular second moment (DASM) assigns larger numbers to textures containing only a few gray level patches:

$$DASM(d, \theta) = \sum_{n=0}^{N_g} p_{x-y}(n, d, \theta)^2 \text{ where:}$$

$$p_{x-y}(n, d, \theta) = \sum_{\substack{j=1 \\ |i-j|=n}}^{N_g} \sum_{i=1}^{N_g} [p(i, j, d, \theta)]^2$$

The contrast (Con) is the moment of inertia around the co-occurrence matrix's main diagonal. It is a measure of the spread of the matrix values and indicates whether pixels vary smoothly in their local neighborhood. The contrast is defined as:

$$Con(d, \theta) = \sum_{n=0}^{N_g-1} n^2 \left[ \sum_{\substack{j=1 \\ |i-j|=n}}^{N_g} \sum_{i=1}^{N_g} [p(i, j, d, \theta)]^2 \right]$$

The inverse difference moment (IDM) measures the local homogeneity of a texture by weighing the contribution of the co-occurrence matrix entries inversely proportional to their distance from the main diagonal:

$$IDM(d, \theta) = \sum_{i=1}^{N_g-1} \sum_{j=1}^{N_g-1} \frac{1}{1-(i-j)^2} p(i, j, d, \theta)$$

The mean (M) is similar to the contrast (Con) measure but weights the off-diagonal terms linearly with the distance from the main diagonal (rather than quadratic weighting as is the case for Contrast):

$$M(d, \theta) = \sum_{n=0}^{N_g-1} n \left[ \sum_{i=1}^{N_g} \sum_{j=1}^{N_g} [p(i, j, d, \theta)]^2 \right]$$

The entropy (H) is similar to the angular second moment and is large for textures that give rise to co-occurrence matrices whose sparse entries have strong support in the image. On the other hand, the entropy (H) is minimal for matrices whose entries are all equally large. The entropy (H) is expressed as:

$$H(d, \theta) = \sum_{j=1}^{N_g} \sum_{i=1}^{N_g} [p(i, j, d, \theta)] \log(p(i, j, d, \theta))$$

Additional texture measures include the sum entropy (SH);

$$SH(d, \theta) = -\sum_{n=0}^{2*N_g-1} p_{x+y}(n, d, \theta) \log(p_{x-y}(n, d, \theta))$$

the difference entropy (DH):

$$DH(d, \theta) = -\sum_{n=0}^{N_g} p_{x-y}(n, d, \theta) \log(p_{x-y}(n, d, \theta))$$

and the difference variance (DV):

$$DV = -\sum_{n=2}^{2N_g} (n - DH)^2 p_{x-y}(n, d, \theta) \text{ where:}$$

$$p_{x-y}(n, d, \theta) = \sum_{\substack{j=1 \\ |i-j|=n}}^{N_g} \sum_{i=1}^{N_g} [p(i, j, d, \theta)]$$

The correlation (Cor) measure is an indication of the linearity of a texture or the strength of degrees of resemblance of the rows and columns of the matrix. The correlation, shade, and prominence are based on:

$$\mu_x = \Sigma_i i \Sigma_j p(i,j,d,\theta), \text{ and } \mu_y = \Sigma_j j \Sigma_i p(i,j,d,\theta).$$

The correlation (Cor) equals:

$$Cor(d, \theta) = \frac{\sum_{i=1}^{N_g-1} \sum_{j=1}^{N_g-1} ij p(i, j, d, \theta) - \mu_x * \mu_y}{\sigma^2}$$

The shade (s) is expressed by the equation:

$$S(d, \theta) = \sum_{i}^{N_g} \sum_{j}^{N_g} (i + j - \mu_x - \mu_y)^3 p(i, j, d, \theta)$$

The prominence (P) is expressed by the equation:

$$P(d, \theta) = \sum_i^{N_g} \sum_j^{N_g} (i+j-\mu_x-\mu_y)^4 p(i, j, d, \theta)$$

The directionality of a texture can be measured by comparing the values obtained for a number of the measures, above, as θ is changed. In applying the technique of the present invention to wildlife video these measures have been computed at θ={0°, 45°, 90° and 135°} using d=1.

In addition to gray level co-occurrence matrix measures, the texture of the content of the video frame is analyzed with Gabor filters. In the spatial domain the image is described by its 2D intensity function. Gabor filters produce spatial-frequency decompositions of the image, similar to the way a Fourier transform represents an image in terms of coefficients of sine and cosine basis functions at a range of frequencies and orientations. The Gabor filter uses combined representations of space and frequency to express signals in terms of "Gabor" functions:

$$f(x, y) = \sum_i a_i g_i(x, y)$$

where a weights the $i^{th}$ complex Gabor basis function:

$$g(x,y) = e^{iw_i(x \cos(\theta_i) + y \sin(\theta_i))} \exp[-(\alpha_i^2 x^2 + \beta_i^2 y^2)]$$

Each image may be convolved with Gabor filters tuned to four different orientations at three different scales to obtain 12 features per pixel. To make the measurements relatively scale invariant, the texture measures obtained include the average of the orientation responses at all scales, the average of the scales' orientation response ranges, the range of the scales' averaged orientation responses, and the range of the scales' orientation response range. Gabor function based wavelets have been shown to be effective for image retrieval.

Fractal dimension measures are also used to specify the texture in the present video content analysis technique. In texture classification and segmentation it is assumed that images or parts of images are "self-similar" at some scale. Self-similarity is the invariance in the geometric properties of an object under isotropic resealing of its lengths. In other words, if a bounded set A (an object) is composed of $N_r$ non-overlapping copies of a set similar to A, but scaled down by a reduction factor $r_t$ then A is self similar. Therefore, the fractal dimension is given by:

$$D = \frac{\log N_r}{\log r}$$

The fractal dimension is approximated by estimating $N_r$ for various values of r and then determining the slope of the least squares linear fit of log $N_r$/log$^{1/r}$. A differential box counting technique is used for estimating $N_r$.

In the present technique, three features have been calculated based on:

(1) the actual image patch I (i,j);
(2) the high graylevel transform of the actual image patch, I (i,j);

$$I_1(i, j) = \begin{cases} I(i, j) - L_1 & I(i, j) > L_1 \\ 0 & \text{otherwise} \end{cases}$$

(3) the low grayevel transform of the actual image patch, I (i,j):

$$I_1(i, j) = \begin{cases} 255 - L_2 & I(i, j) > 255 - L_2 \\ I_1(i, j) & \text{otherwise} \end{cases}$$

where $L_1 = g_{min} + \frac{1}{2}g_{avg}$, $L_2 = g_{max} - \frac{1}{2}g_{avg}$, and $g_{min}$, $g_{max}$, and $g_{avg}$ are, respectively, the minimum, maximum and average graylevels in the image patch.

A fourth feature is based on multi-fractals which are useful for self-similar distributions exhibiting non-isotropic and nonhomogeneous scaling properties. If k and l are the minimum and maximum graylevel of an image patch centered at the position (i,j); $n_r(i,j)=l-k+1$, and $\tilde{N}_r=n_r/N_r$, then the multi-fractal, $D_2$ is defined by:

$$D_2 = \lim_{r \to 0} \frac{\log \sum_{i,j} \tilde{N}_r^2}{\log r}$$

A number of different values of r may be used. An estimate of D is the result of the linear regression of log $\Sigma_{i,j} N_r^2$ log r.

Figure 6:
FIG. 6 illustrates a frame of video and numerous representations of the frame resulting from the application of color and texture filters.

FIG. 6 illustrates feature space outputs from multiple color and texture filters applied to a video frame.

Figure 7:
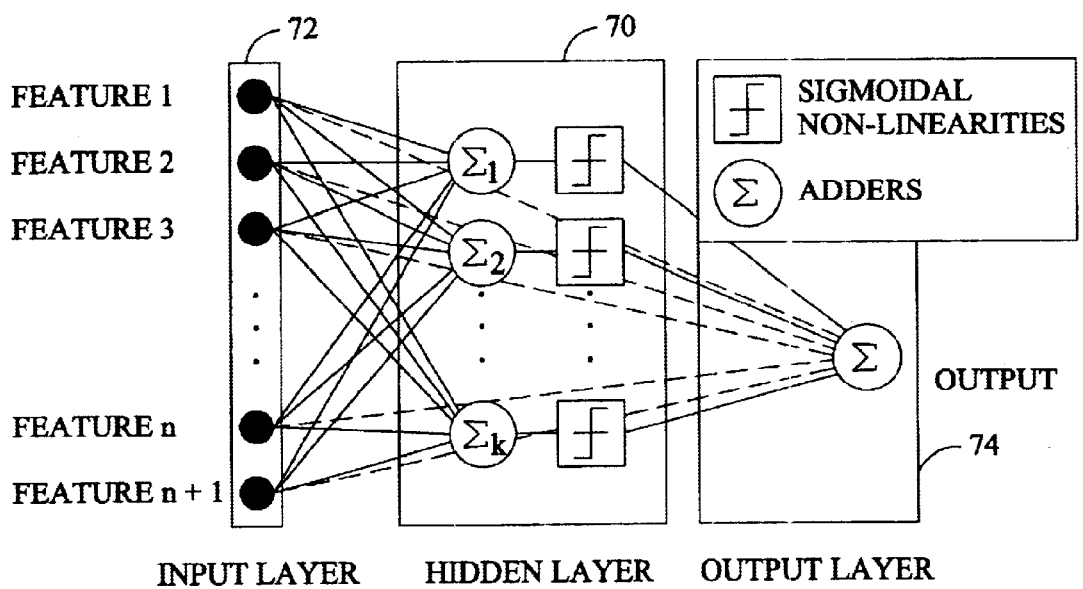
FIG. 7 is a block,diagram of a neural network used for image region classification.

At the second or intermediate level 12 of the video content analysis. technique, regions of the image are classified or labeled. A neural network, as illustrated in FIG.7, may be used to arbitrate between the different measures describing the content of a frame to classify the various regions of interest. A neural network having a single hidden layer 70, and utilizing a sigmoidal activation function has been found suitable for this task:

$$\phi(act) = \frac{1}{1 + e^{-act}}$$

The back propagation algorithm propagates the input, layer-by-layer (left to right), from input 72 to output 74 layer and back propagates the errors, layer-by-layer (right to left), from output to input. As the errors are propagated: back to the input, part of each unit's error is being corrected.

Figure 8:
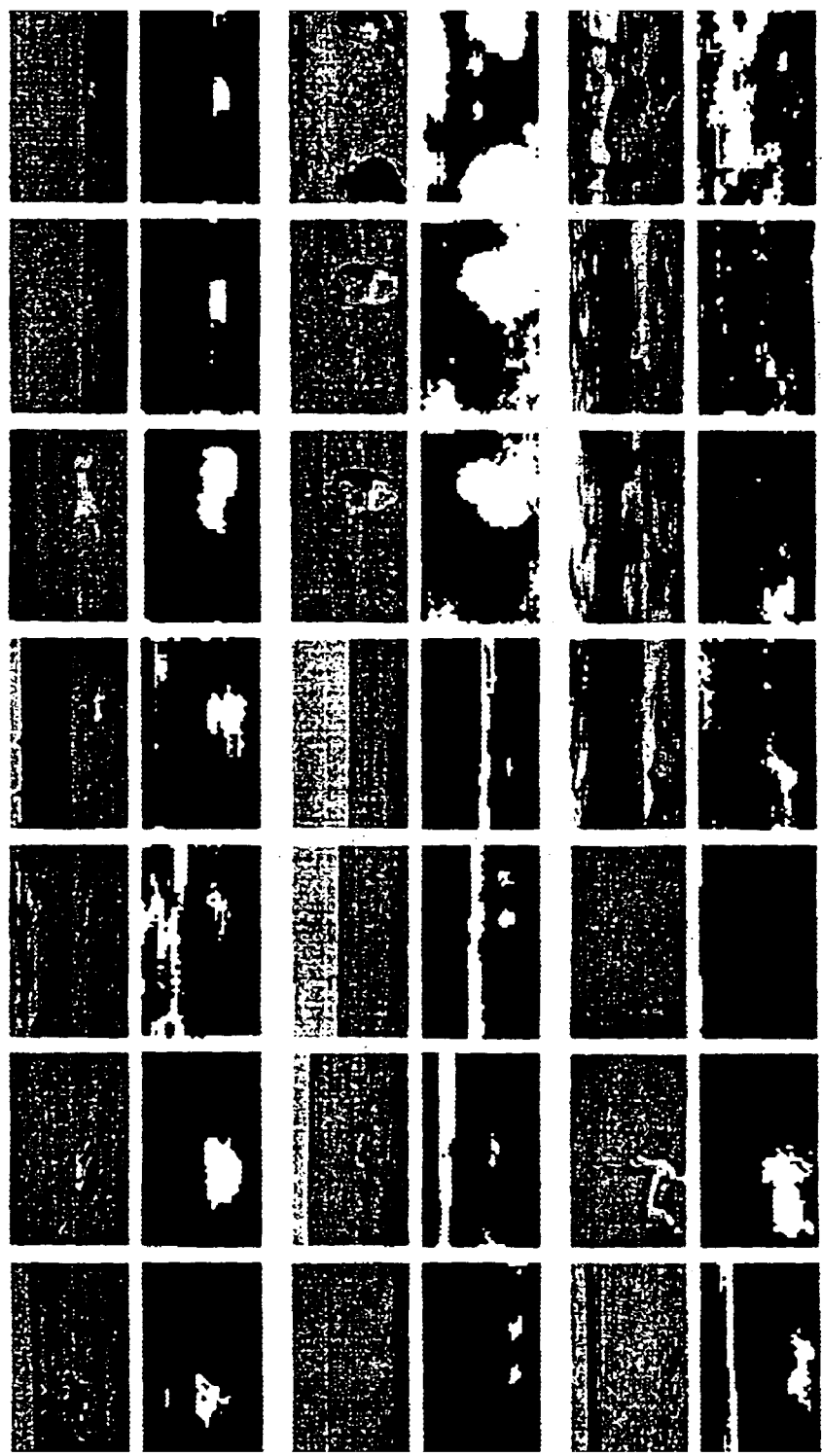
FIG. 8 illustrates color and texture-based representations of regions of several exemplary video frames.

After training on a number of training frames, the neural network is used to classify previously unclassified video. The neural network image region classifier applies the size, motion, color and texture data obtained in the first level of the technique to classify identified motion blobs. FIG. 8 illustrates the result of applying the neural network image region classifier to combine color and texture information related to frames of wildlife video. A number of video frames are shown in rows 1, 3, and 5 with the corresponding feature analysis of classification results illustrated in rows 2, 4, and 6.

Each shot detected or forced at the first level 4 of the video content analysis technique is summarized 16 at the second level 12 of the technique. The shot summaries provide a means of encapsulating the details of the feature and motion analysis performed at the first 4 and second 12 levels of the technique so that an event inference module in the third level 18 of the technique may be developed independent of the details in the first two levels. The shot summaries also abstract the lower level analysis results so that they can be read and interpreted more easily by humans. This facilitates video indexing, retrieval, and browsing in video databases and the development of algorithms to perform these activities.

In general, shot descriptors used in the shot summary include object, spatial, and temporal descriptors. The object descriptors indicate the existence of certain objects in the video frame; for example, "animal", "tree", "sky/cloud", "grass", "rock", etc. The spatial descriptors represent location and size information related to objects and the spatial relations between objects in terms of spatial prepositions, such as "inside", "next to", "on top of", etc. Temporal descriptors represent motion information related to objects and the temporal relations between them. These may be expressed in temporal prepositions, such as, "while", "before", "after," etc.

An exemplary shot summary for an animal hunt detection application of the technique is illustrated in FIG. 9. This summary uses descriptors which describe: whether the shot is forced or detected 90, the frame number at the beginning of the shot 92, the frame number at the end of the shot 94, the global motion 96, the within frame object motion 98; the initial object location 100, the final object location 102, the initial object size 104, the final object size 106, the smoothness of the motion 108 the precision throughout the shot 110, and the recall throughout the shot 112. The motion descriptors provide information about the x- and y- translation and the zoom components of motion. The location and size descriptors 100,102,104, and 106 indicate the location and size of the detected dominant motion blob at the beginning and end of the shot. The precision descriptor 110 describes the average ratio of the number of objects labeled within the detected dominant motion blob versus the size of the blob. In the case of a wildlife video, the precision would measure the average number of blobs labeled as animal within a motion blob. This might be an indication of a hunting animal in the presence of its prey. The recall 112 is the average of the ratio of the number of a particular label within the dominant motion blob versus the number of labels of that type in the entire frame. In addition, in an animal hunt sequence detection analysis, descriptors indicating that tracking is engaged 114, that object motion is fast 116, that an animal is present 118, the beginning of a hunt 120, number of consecutive hunt shot candidates found 122, the end of the hunt 123, and whether a valid hunt was found 124 are employed. This "hunt information" is designated true (1) or false (0) and is used in the event inference module to determine whether a valid hunt has been detected.

Figure 10:
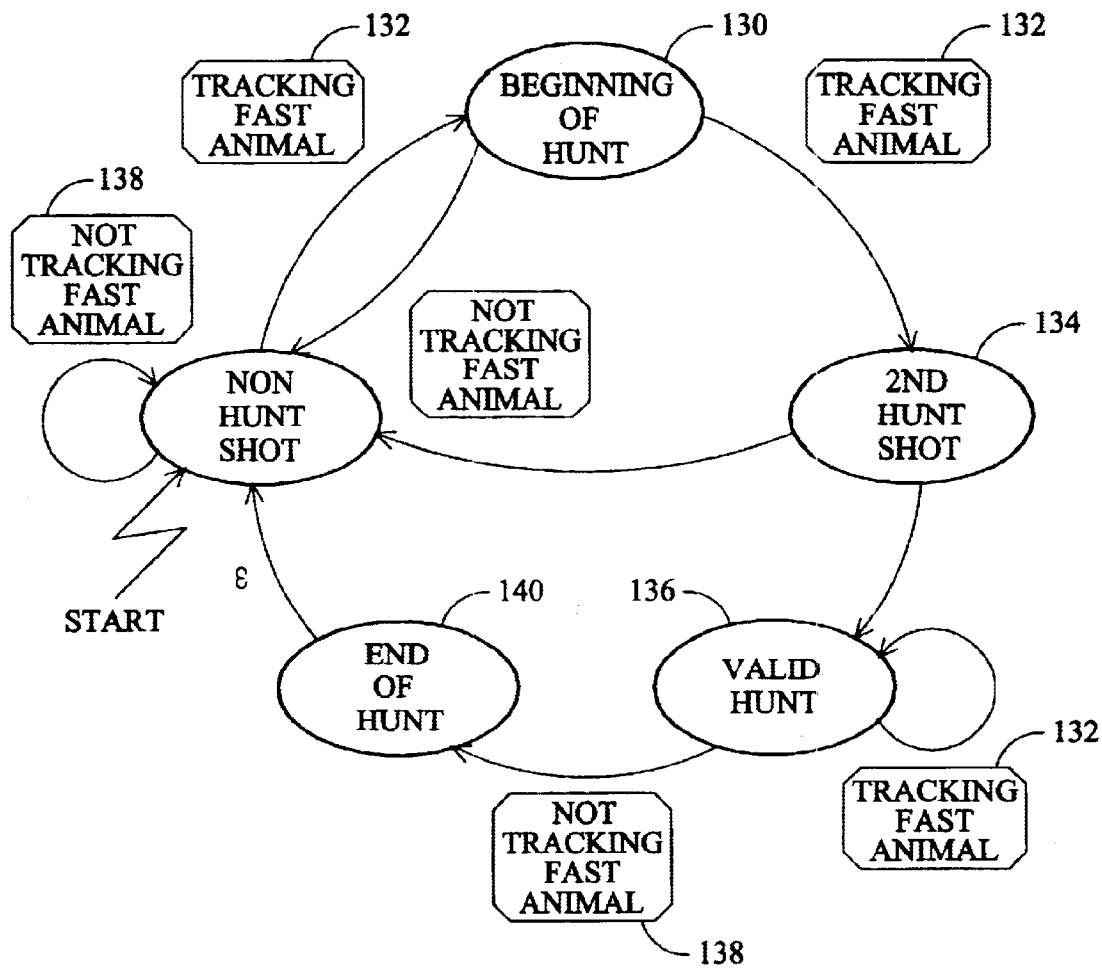
FIG. 10 is a state diagram for an event inference module for detecting animal hunts in wildlife video.

Events 22 are detected by an event inference module 20 at the third level 18 of the technique. Event inference 20 is based on domain or subject matter specific knowledge developed from observation of video and shot summaries generated at the intermediate level 12 of the technique. For example, an animal hunt usually comprises an extended period during which the animal is moving fast, followed by the slowing or stopping of the animal. Referring to FIG. 10, a state diagram illustrates an animal hunt detection inference module. In this model inference module, a hunt event is inferred after detecting three shots containing hunt candidates (the video is tracking a fast moving animal) which are followed by a shot in which the video is no longer tracking a fast moving animal. A candidate shot for the beginning of a hunt 130 is detected when the shot descriptors 132, generated at the second level 12 of the technique, for "tracking", "fast," and "animal" are all "true." If these shot descriptors 132 hold "true" for the subsequent shot or second shot 134 and the next subsequent shot, a valid hunt 136 is declared. When, in a subsequent shot,.these descriptors are no longer all "true" 138 the inference module declares an end of the hunt 140. In a similar way, events in other domains can be inferred by matching the occurrence of objects and their spatial and temporal relationships detected in the low-level visual analysis of the technique with higher-level rules specific to particular events in a specific domain.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A computerized method of inferring an event portrayed in a video sequence having semantic content that belongs to at least one known domain, said video sequence having one or more intervals each containing a plurality of sequential frames, said method comprising the steps of:
    (a) a computer analyzing the content of said video over at least one interval of said one or more intervals;
    (b) a computer summarizing said analysis over said at least one interval; and
    (c) a computer inferring from said summary whether or not said event is portrayed in said video sequence based on criteria associated with said semantic content.

2. The method of claim 1 wherein said step of analyzing said content of said video sequence comprises the steps of:
    (a) segmenting said video sequence into said one or more intervals where each of said intervals contains relatively homogeneous content among said plurality of sequential frames within said interval;
    (b) detecting an object in said content; and
    (c) measuring at least one of a color and a texture of said content.

3. The method of claim 2 wherein a color histogram evaluates the content of each of said plurality of sequential frames within said one or more intervals.

4. The method of claim 2 wherein said object is detected by comparing said content of a first frame with said content of a second frame.

5. The method of claim 3 further comprising the step of adjusting the content of said plurality of sequential frames within at least one interval of said one or more intervals for a global motion of said content within said at least one interval.

6. The method of claim 1 wherein said step of summarizing said analysis comprises characterizing said content with at least one of a spatial descriptor, a temporal descriptor and an object descriptor.

7. The method of claim 1 wherein said event is inferred from at least one of a spatial descriptor, a temporal descriptor and an object descriptor in said summary.

8. A computerized method of inferring an event portrayed in a video sequence having semantic content that belongs to at least one known domain, said method comprising the steps of:
    (a) a computer decomposing said video into at least one plurality of frames having relatively homogenous content;
    (b) a computer detecting an object in said content;
    (c) a computer classifying said object;
    (d) a computer characterizing said content of said at least one plurality of frames by at least one of a spatial descriptor, a temporal descriptor, and an object descriptor; and (e) a computer inferring from said characterization of said content whether or not said event is portrayed in said video sequence based on criteria associated with said semantic content.

9. The method of claim 8 wherein said object is detected by comparing said content of a first frame with said content of a second frame of said at least one plurality of frames.

10. The method of claim 9 wherein comparing said content includes a step of adjusting said content for a global motion of said content between said first frame and said second frame.

11. The method of claim 8 wherein at least one of a texture and a color measure of said content is used to classify said object.

12. The method of claim 8 wherein said at least one plurality of frames are is detected by comparing a plurality of histograms of said content.

13. A computerized method of inferring an event portrayed in a video sequence having semantic content that belongs to at least one known domain, said video sequence having one or more intervals each containing a plurality of sequential frames, said method comprising the steps of:

(a) a computer decomposing said video into said one or more intervals where each of said intervals has relatively homogenous content;

(b) a computer detecting an object moving independent of a global motion of said content;

(c) a computer measuring the position of said object in an initial frame and a subsequent frame of said one or more intervals;

(d) a computer measuring the size of said object;

(e) a computer measuring at least one of a color and a texture of said content;

(f) a computer classifying said object from at least one of said at least one of a color and texture measure, said position measure, and said size measure;

(g) a computer summarizing said content over said one or more intervals by characterizing at least one of said classification of said object in said initial frame and said subsequent frame; and (h) a computer inferring from said summary whether or not said event is portrayed in said video sequence based on criteria associated with said semantic content.

14. The method of claim 13 wherein said object is detected by comparing said content of a first frame with said content of a second frame, said content being adjusted for said global motion of said content.

15. The method of claim 13 wherein a boundary of said shot is detected by comparing a first histogram representing said content of a first frame of said video with a second histogram representing said content of a second frame.

* * * * *